United States Patent
Murakami (10) Patent No.: US 6,816,631 B1
(45) Date of Patent: Nov. 9, 2004

(54) CALCULATIONS OF COORDINATES OF TARGET IMAGE DISPLAYED ON MONITOR SCREEN

(75) Inventor: Naoyuki Murakami, Tokyo (JP)

(73) Assignee: Record Audio Inc., Tokyo (JP)

(*) Notice: Subject to any disclaimer, the term of this patent is extended or adjusted under 35 U.S.C. 154(b) by 521 days.

(21) Appl. No.: 09/625,478

(22) Filed: Jul. 25, 2000

(30) Foreign Application Priority Data

Jul. 26, 1999 (JP) ............................................. 11-210250

(51) Int. Cl.[7] ............................. G06K 9/36; H04N 5/08; A63B 67/00
(52) U.S. Cl. ........................... 382/291; 348/525; 463/49
(58) Field of Search ................................ 382/281, 291; 463/5, 49–57; 345/204, 207; 348/138, 525, 169, 174, 180, 521, 522, 526, 540, 547, 548, 181

(56) References Cited

U.S. PATENT DOCUMENTS

| | | | | |
|---|---|---|---|---|
| 3,710,011 A | * | 1/1973 | Altemus et al. | 348/34 |
| 4,571,617 A | * | 2/1986 | Hasili | 348/180 |
| 4,829,308 A | * | 5/1989 | Tol et al. | 342/185 |
| 5,196,873 A | * | 3/1993 | Yamanobe et al. | 351/210 |
| 5,366,229 A | * | 11/1994 | Suzuki | 463/5 |
| 6,219,106 B1 | * | 4/2001 | Sato | 348/525 |

* cited by examiner

Primary Examiner—Kanji Patel
(74) Attorney, Agent, or Firm—Reed Smith LLP (57) ABSTRACT

Coordinates of a target are calculated by measuring time between the generation of a vertical synchronizing signal fetched from a composite signal for displaying the target image on a video monitor and a singular change of a video signal and calculating the coordinates of the target image displayed on the video monitor from this measured time. In this way, the coordinates of the target image where it is displayed on the video monitor can be calculated very rapidly.

10 Claims, 8 Drawing Sheets

CALCULATIONS OF COORDINATES OF TARGET IMAGE DISPLAYED ON MONITOR SCREEN

BACKGROUND OF THE INVENTION

This invention relates to a method of calculating the coordinates of a target image where it is displayed on a video monitor, from a composite signal consisting of video signals and synchronizing signals for displaying a target, such as a light-emitter, photographed by a vide camera or a target stored in a video recorder, on the video monitor, and an apparatus for carrying out this method.

For the coordinates of a particular location, a mark, or a target, such as a light-emitter, photographed by a video camera or a target stored in a video recorder where it is displayed on a video monitor, count values of the number of pixel dots are converted into digital values. The coordinates are calculated by the digital values so that these digital coordinates are returned to analog values, which are output to an external device, for example, an image editor.

As mentioned above, when data are processed through means for an analog-to-digital conversion, a digital calculation, and a digital-to-analog conversion, much time is spent until the coordinate values are output. In particular, a video image that has a large number of dots requires an extremely long processing time. In a common video image, images for 60 fields per second are scanned and switched. Unless an arithmetical element has a very high arithmetical processing speed, cases frequently occur in which a timely output of each of the coordinate values is not obtained until one field is completed and the next field appears. Where the coordinate values are calculated and output in succession, output delays may be accumulated to give rise to problems.

SUMMARY OF THE INVENTION

It is, therefore, an object of the present invention to provide a method of calculating the coordinates of a target image in which the coordinates of the target image where it is displayed on a monitor can be calculated very rapidly and an apparatus for carrying out this method.

In order to achieve this object, the method of calculating the coordinates of the target image according to the present invention involves measuring time between the generation of a vertical synchronizing signal fetched from a composite signal for displaying the target image on a video monitor and a singular change of a video signal therefrom and calculating the coordinates of the target image displayed on the video monitor from this measured time.

According to this method of calculating the coordinates of a target image, the coordinates of the target image are calculated in accordance with the time between the output of the vertical synchronizing signal and the singular change of the video signal, without requiring the analog-to-digital conversion or digital-to-analog conversion of data. Thus, the data of the coordinates can be obtained in a short processing time.

The method of calculating the coordinates of a target image according to the present invention may be carried out in such a way that Y coordinate is calculated from the time measured and X coordinate is calculated from measuring time between generation of a horizontal synchronizing signal produced immediately before the video signal and the singular change.

Specifically, the video signal bringing about the singular change is a maximum or minimum voltage signal selected from video signals near here.

Such video signal bringing about the singular change may be given from a voltage of a video signal compared with a threshold.

The target image refers to an image of a light-emitter photographed by a video camera.

According to the present invention, an apparatus for calculating the coordinates of a target image to carry out the method of calculating the coordinates of a target image includes a means for generating a composite signal to display a target image on a video monitor, a means for measuring time between the generation of a vertical synchronizing signal fetched from the composite signal and a singular change of a video signal therefrom, and a means for calculating the coordinates of the target image displayed on the video monitor from this measured time.

This apparatus may include a means for calculating Y coordinate of the target image from the time measured above, means for calculating X coordinate from measuring time between the generation of a horizontal synchronizing signal produced immediately before the video signal and the singular change, and means for measuring the time.

This apparatus may have a comparator for selecting a maximum or minimum voltage from video signals near here to extract the video signal bringing about the singular change.

The comparator may be for comparing a voltage of each video signal compared with a threshold.

Also, the means for generating the composite signal is a video camera.

This and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

In accordance with the drawings, the preferred embodiments of the present invention will be described in detail below.

Figure 1:
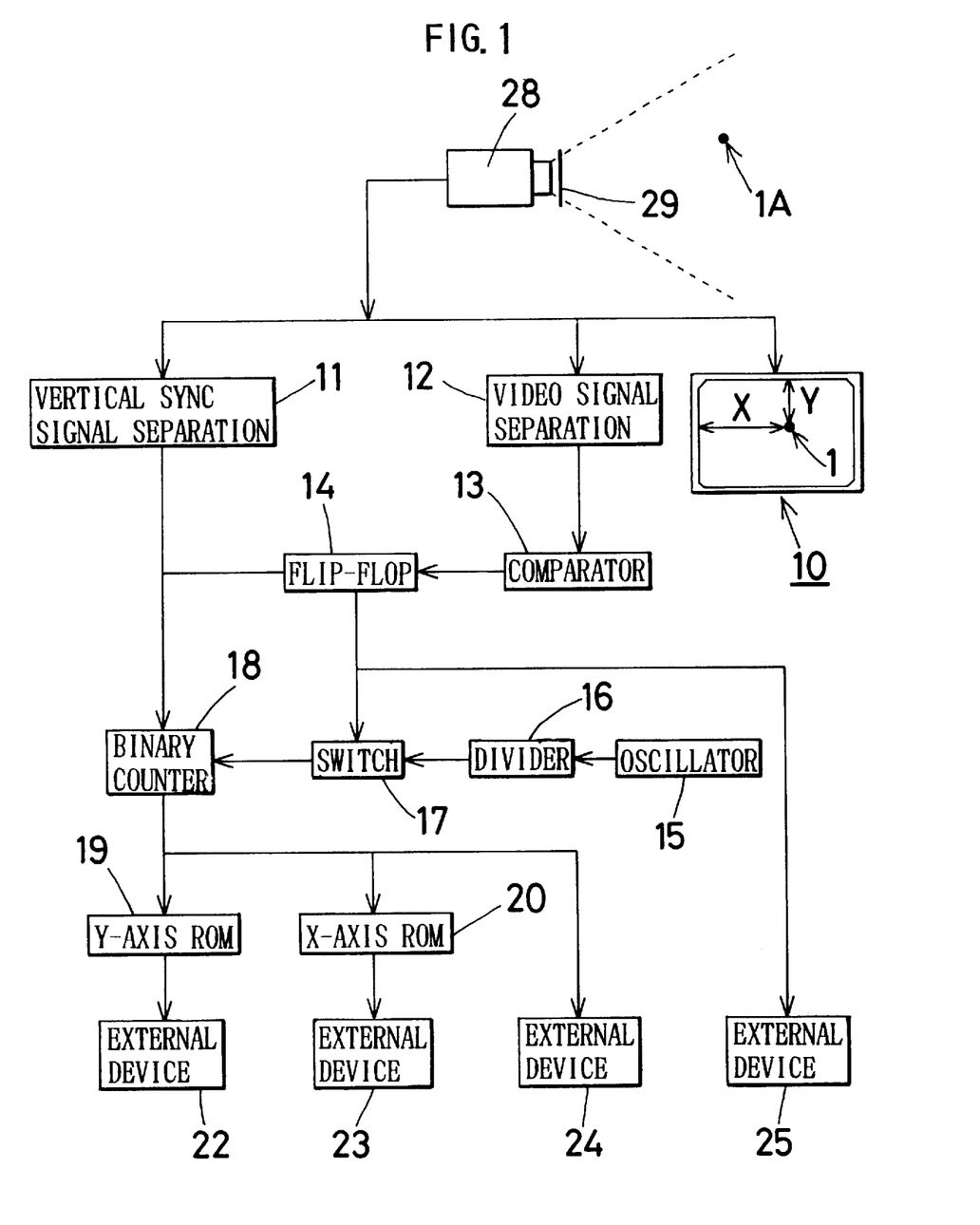
FIG. 1 is a circuit block diagram of an apparatus for calculating the coordinates of a target image to carry out a method of calculating the coordinates of a target image applied to the present invention.

FIG. 1 shows an example of a circuit block diagram of an apparatus for calculating the coordinates of a target image to carry out a method of calculating the coordinates of a target image applied to the present invention. The apparatus for calculating the coordinates of a target image in this embodiment is constructed so that a target image 1 is displayed on a video monitor 10 and the data of the coordinates of the target image are output to external devices 22 and 23. In this apparatus, a vertical synchronizing signal separation circuit 11, a video signal separation circuit 12, and the video monitor 10 are connected to the output of a video camera 28.

Figure 2:
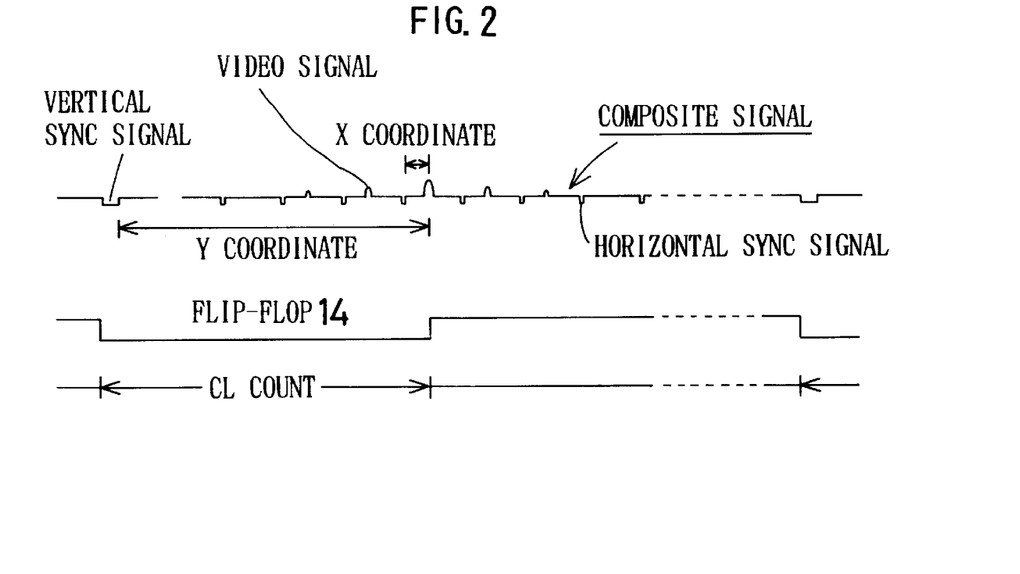
FIG. 2 is a time chart where the method of calculating the coordinates of a target image applied to the present invention is carried out.
Figure 3:
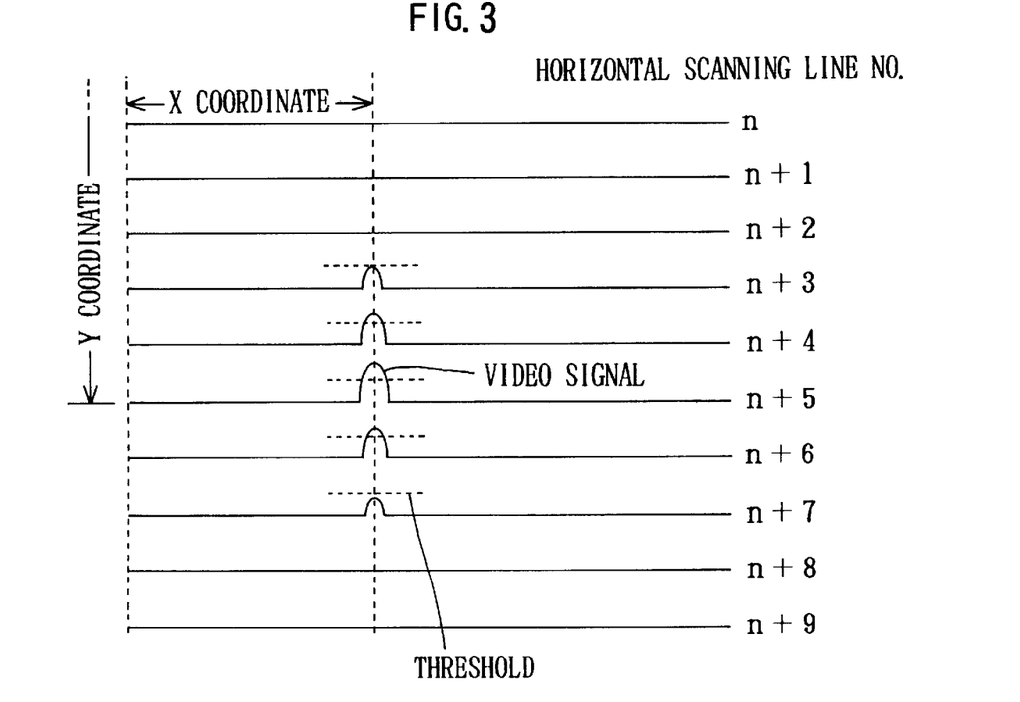
FIG. 3 is a diagram for explaining the principle of the method of calculating the coordinates of a target image applied to the present invention.

The video camera 28 is a monochrome camera with a CCD (charge coupled device) outputting an NTSC composite signal and is provided with an infrared-transparent filter 29 in front thereof. A target 1A including an infrared-emitting element (LED) exists in the visual field of the video camera 28. When the target 1A emits light, the target image 1 is displayed on the video monitor 10. Specifically, the target 1A emits light and thereby a composite signal shown in a flow chart of FIG. 2 is fed from the video camera 28. A vertical synchronizing signal is produced in each field. With the composite signal in this embodiment, the vertical synchronizing signal is generated every 1/60 second and fields are renewed 60 times per second (60 Hz). A horizontal synchronizing signal is generated in each scanning line. In this embodiment, 256 scanning lines per field are available and 60×256=15360 scanning lines per second are produced (15360 Hz). The video signal appears as an analog signal with voltage intensity. When this principle is illustrated in terms of a plane of one field, as shown in FIG. 3, the voltage of the video signal increases progressively in going to the center (a horizontal scanning line n+5) of the target image 1. When the voltage exceeds a threshold, the video signal is thought of as bringing about a singular change.

To the output of the video signal separation circuit 12 is connected a voltage comparator 13, the output of which is connected to the set terminal of a flip-flop circuit 14. The reset terminal of the flip-flop circuit 14 is coupled to the output of the vertical synchronizing signal separation circuit 11. The output of the flip-flop circuit 14 is also coupled to the operating piece of a switch circuit 17. A quartz oscillator 15 is connected through a frequency divider 16 to the switch circuit 17, which is connected to the CL count-up terminal of a 16-bit binary counter 18. The output of the binary counter 18 is connected to a Y-axis ROM 19, an X-axis ROM 20, and an external device 24. In the Y-axis ROM 19, data indicative of the relationship between the count time signal of the binary counter 18 and a scanning line number n, namely a vertical position of the scanning line, are stored. Data indicative of the relationship between the count time signal of the binary counter 18 and the scanning speed of the horizontal scanning lines are stored in the X-axis ROM 20. The outputs of the Y-axis ROM 19 and the X-axis ROM 20 are connected to the external device 22 and the external device 23, respectively. The output of the flip-flop circuit 14 is also connected to an external device 25.

The coordinates of the target image 1 of the target 1A displayed on the video monitor 10 are calculated as follows: The vertical synchronizing signal is fetched from the output composite signal of the video camera 28 through the vertical synchronizing signal separation circuit 11, and the video signal is fetched through the video signal separation circuit 12. The vertical synchronizing signal resets the binary counter 18 and the flip-flop circuit 14. A CL signal delivered from the quartz oscillator 15 is divided to 4.12 MHz by the frequency divider 16, and is counted up by the binary counter 18 through the switch circuit 17 conducting in a state where the flip-flop circuit 14 is reset. On the other hand, the video signal fed to the voltage comparator 13, when exceeding the threshold (see FIG. 3), is input to the flip-flop circuit 14 to bring about a set state as shown in the time chart of FIG. 2. Hence, the switch circuit 17 is broken and the CL count of the binary counter 18 is completed. The data of count time thus obtained (time ranging from the start of the scan of one field to the generation of the signal of the target image 1) are input to the Y-axis ROM 19 and the X-axis ROM 20. In the Y-axis ROM 19, the count time is collated with the time signal and the scanning line number n, stored therein and the Y coordinate is calculated. In the X-axis ROM 20, the count time of the binary counter 18 is collated with the scanning speed stored therein and the X coordinate is calculated.

When the next vertical synchronizing signal appears, the binary counter 18 and the flip-flop circuit 14 are reset again, and the same circuit operation as in the above description is repeated with respect to the next field. In this way, the Y coordinate and the X coordinate are calculated and are output from the external device 22 and the external device 23, respectively. Also, each of the external devices 22 and 23 is an arithmetical circuit for using the values of the Y and X coordinates of the target image 1 to make another calculation, or an I/O circuit for input to a personal computer or other devices. The external device 24 is a device for using the time ranging from the start of the scan of one field to the generation of the signal of the target image 1 to perform another calculation or a new action. The external device 25 is a device for using the reset state or the set state of the flip-flop circuit 14, namely timing for displaying the target image 1, to perform another calculation or a new action.

In the above embodiment, the refresh rate of the field is set to 60 Hz as in an ordinary video camera, but even when it is higher, the coordinates of the target image can be calculated in each field without any difficulty.

Figure 4:
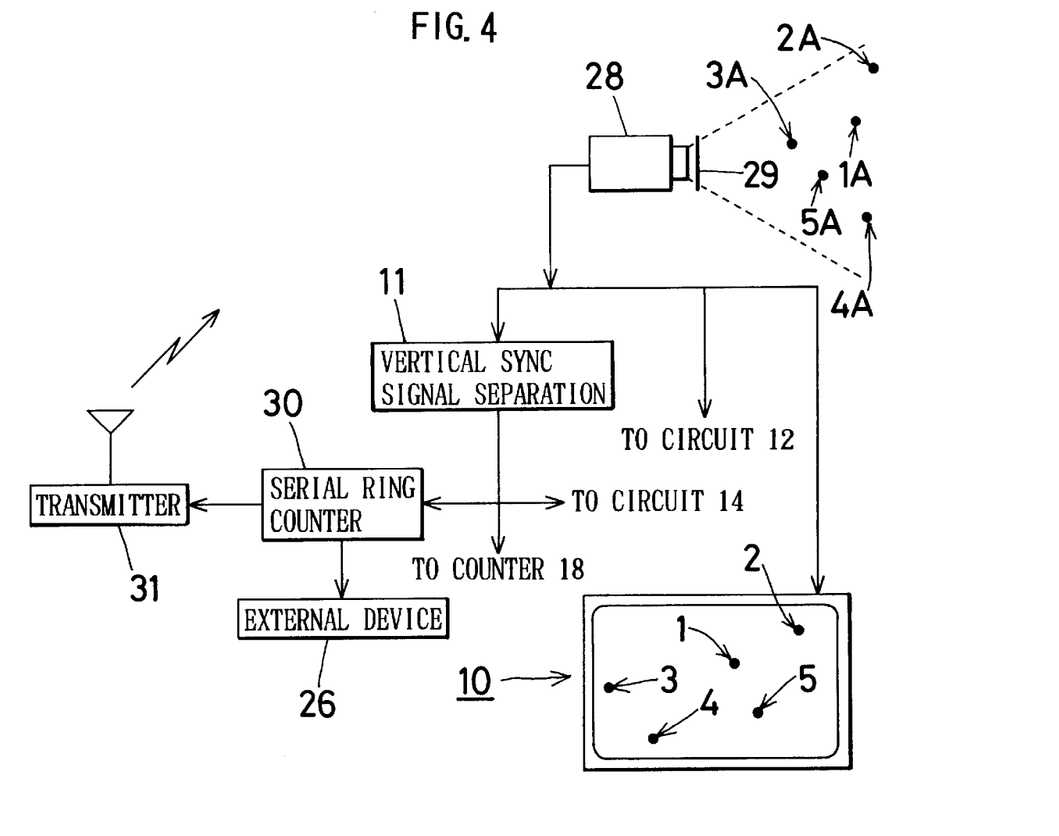
FIG. 4 is a view showing essential parts of the circuit configuration of an apparatus for calculating the coordinates of a target image to carry out a method of calculating the coordinates of a target image in another aspect, applied to the present invention.

FIG. 4 shows essential parts of the circuit configuration of an apparatus for calculating the coordinates of a target image to carry out a method of calculating the coordinates of a target image in another aspect, applied to the present invention. In the apparatus for calculating the coordinates of a target image in this embodiment, five targets 1A, 2A, 3A, 4A, and 5A that have infrared-emitting elements with luminance of the same extent exist in the visual field of the video camera 28. Each of these targets 1A, 2A, 3A, 4A, and 5A incorporates a radio receiver so that its infrared-emitting element emits light only while an address signal of the target itself is received.

The circuit configuration of the embodiment, although partially omitted in FIG. 4, as in the circuit block diagram of FIG. 1, includes the video monitor 10, the vertical synchronizing signal separation circuit 11, the video signal separation circuit 12, the voltage comparator 13, the flip-flop circuit 14, the frequency divider 16, the oscillator 15, the switch circuit 17, the binary counter 18, the Y-axis ROM 19, the X-axis ROM 20, and the external devices 22, 23, 24, and 25. Furthermore, the apparatus for calculating the coordinates of a target image is provided with a serial ring counter 30, a radio transmitter 31, and an external device 26.

Figure 5:
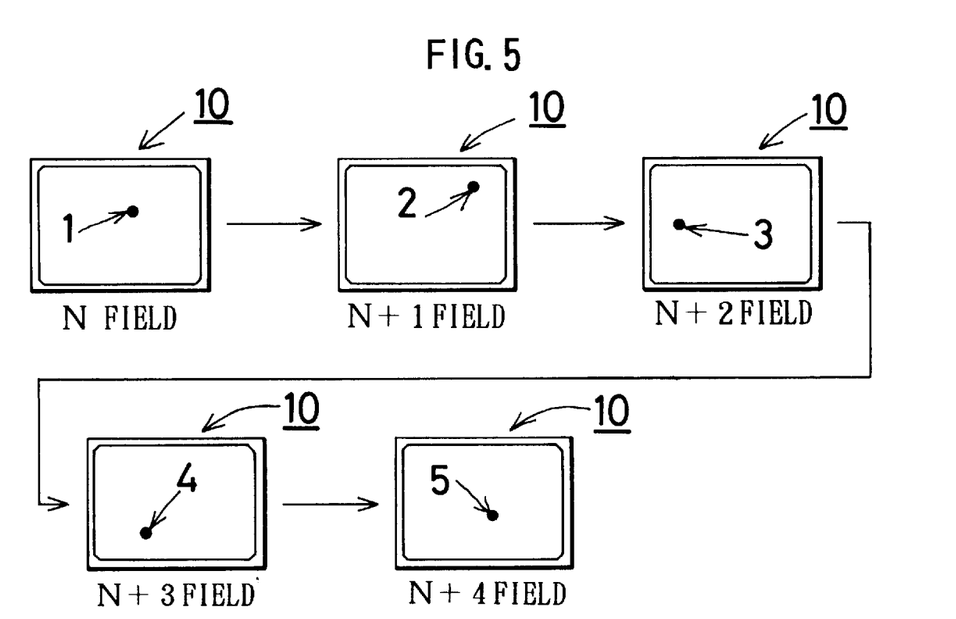
FIG. 5 is a view showing a displaying state where the method of calculating the coordinates of a target image in FIG. 4 is carried out.

When the target 1A emits light, the target image 1 is displayed on the video monitor 10 (see an N field in FIG. 5). Subsequently, when the target 2A emits light, a target image 2 (N+1 field) is displayed on the video monitor 10; the target 3A, a target image 3 (N+2 field); the target 4A, a target image 4 (N+3 field); and the target 5A, a target image 5 (N+4 field). These images are displayed at a high cycling rate and thereby, as visually shown by the video monitor 10 in FIG. 4, the five target images 1, 2, 3, 4, and 5 are observed simultaneously.

Since the vertical synchronizing signal appears each time the field is changed, an address N of the field is specified by counting the number of fields. Using this fact, the coordinates of the target images 1, 2, 3, 4, and 5 are calculated as follows:

The vertical synchronizing signals fetched from the output composite signals of the video camera 28 through the vertical synchronizing signal separation circuit 11 are counted by the serial ring counter 30. Consequently, the address of the N field is specified and its address signal oscillates through the radio transmitter 31. The receiver incorporated in the target 1A corresponding to the address signal of the N field receives the address signal, and the target 1A emits light. The description of the process ranging from the emission of light of the target 1A to the calculation of the coordinates of the target image 1, which is already given in detail, is omitted here.

Subsequently, the vertical synchronizing signal initiating an image display in the N+1 field appears and is counted up by the serial ring counter 30. After the target 2A emits light, the target image of the N+1 field is displayed and its coordinates are calculated. In this way, the counting-up of succeeding vertical synchronizing signals is repeated, and when there are targets corresponding to their addresses, the targets emit light, so that the target images are displayed in succession and their coordinates are calculated.

Also, the external device 26 is a device utilizing the output (field address signal) of the serial ring counter 30.

Figure 6:
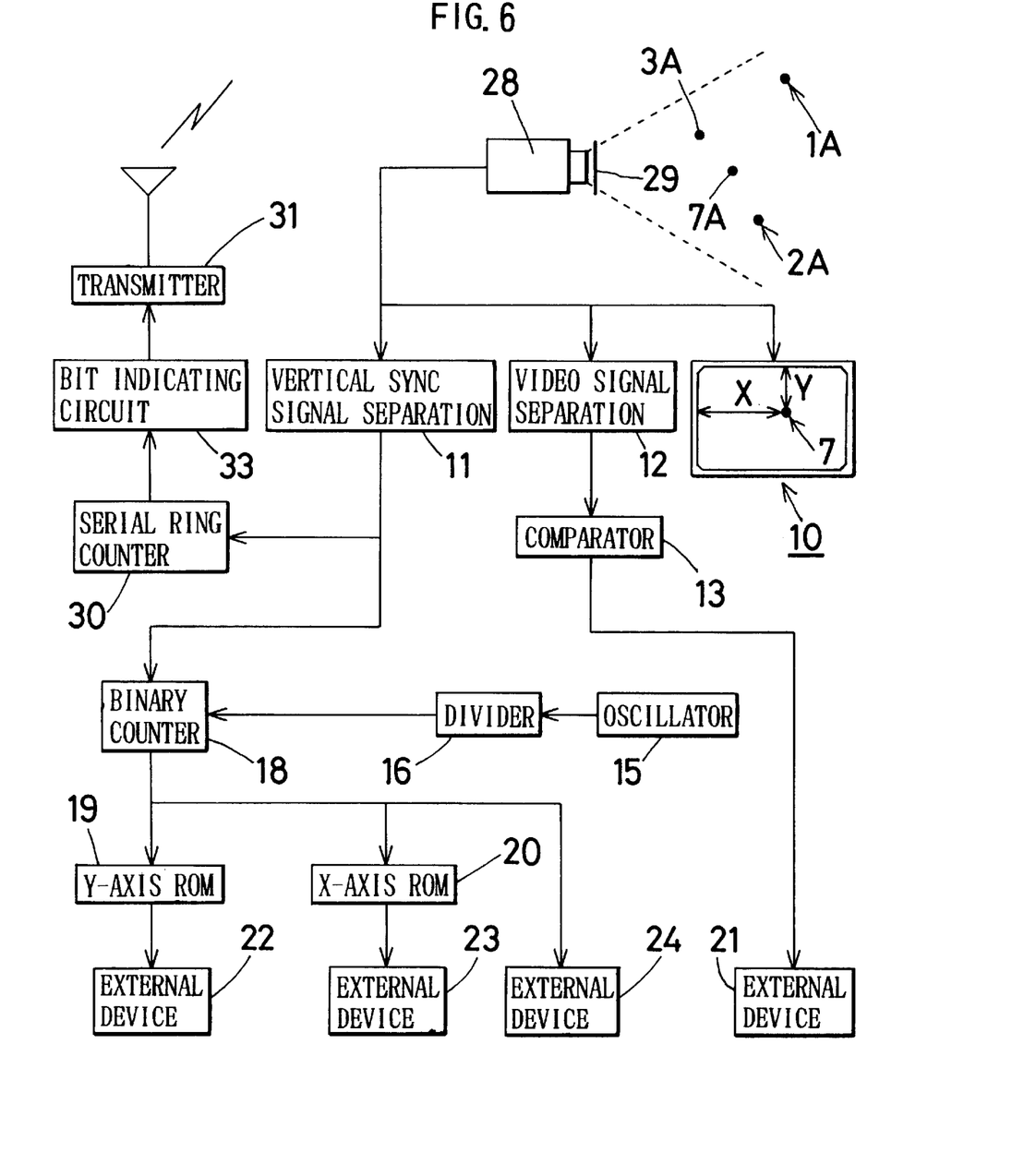
FIG. 6 is a circuit block diagram of an apparatus for calculating the coordinates of a target image to carry out a method of calculating the coordinates of a target image in still another aspect, applied to the present invention.

FIG. 6 shows a circuit block diagram of an apparatus for calculating the coordinates of a target image to carry out a method of calculating the coordinates of a target image in still another aspect, applied to the present invention. In the apparatus for calculating the coordinates of a target image in this embodiment, three targets 1A, 2A, and 3A, each having an infrared-emitting element with luminance of the same extent, and a reference target 7A including an infrared-emitting element with luminance of the same extent as these targets exist in the visual field of the video camera 28. The apparatus houses a bit indicating circuit 33 so that each infrared-emitting element is turned on or off in accordance with a received signal. The reference target 7A has an inherent on-off switch.

The circuit configuration of the apparatus for calculating the coordinates of a target image shown in FIG. 6 includes the video monitor 10, the vertical synchronizing signal separation circuit 11, the video signal separation circuit 12, the voltage comparator 13, the frequency divider 16, the oscillator 15, the binary counter 18, the Y-axis ROM 19, the X-axis ROM 20, and the external devices 21, 22, 23, and 24. The vertical synchronizing signal separation circuit 11 is connected to the serial ring counter 30, followed by a bit indicating circuit 33 and the radio transmitter 31.

As shown in FIG. 6, when the switch of the reference target 7A is turned on, the reference target 7A emits light and a reference target image 7 is displayed on the video monitor 10. Unless the switch is tuned off, the reference target 7A continues to emit light and the reference target image 7 remains displayed.

Figure 7:
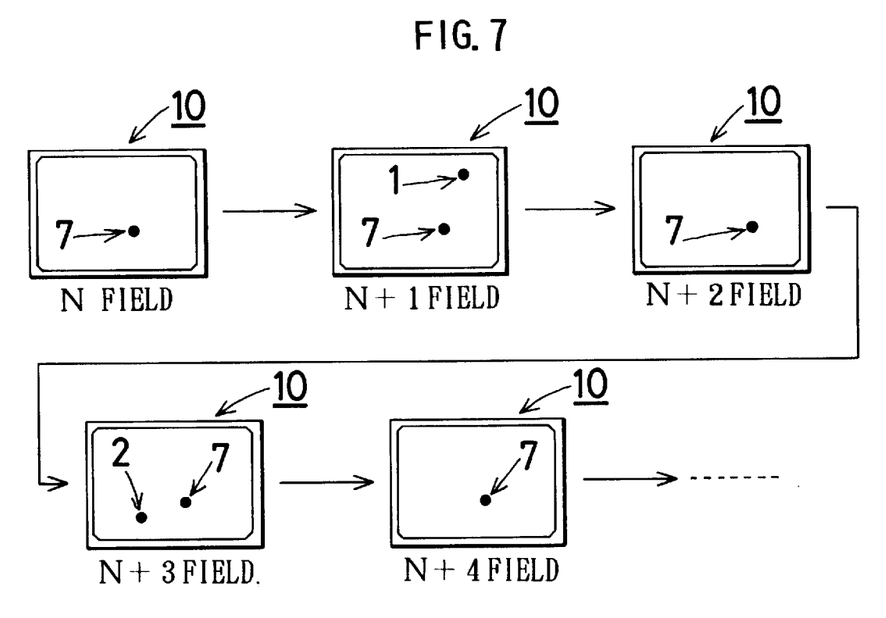
FIG. 7 is a view showing a displaying state where the method of calculating the coordinates of a target image in FIG. 6 is carried out.

As indicated by the N field shown in FIG. 7, only the reference target image 7 is initially displayed on the video monitor 10. In accordance with the output of the serial ring counter 30 that counts the vertical synchronizing signals, the bit indicating circuit 33 is opened or closed. Thus, when another vertical synchronizing signal is counted, an on signal is delivered from the bit indicating circuit 33 and is received, through the radio transmitter 31, by the radio receiver housed in the target 1A corresponding to the address signal of the N+1 field to cause the emission of light of the target 1A. Consequently, as indicated by the N+1 field of FIG. 7, the target image 1 is displayed, together with the reference target image 7, on the video monitor 10. When a third vertical synchronizing signal is counted, an off signal is delivered from the bit indicating circuit 33 and is received, through the radio transmitter 31, by the radio receiver of the target 1A to turn off the light of the target 1A. As such, in the N+2 field, only the reference target image 7 is displayed. For a fourth vertical synchronizing signal, the on signal is transmitted from the bit indicating circuit 33 and is received by the radio receiver incorporated in the target 2A corresponding to the address signal of the N+3 field to cause the emission of light of the target 2A. Hence, in the N+3 field, the target image 2 is displayed, along with the reference target image 7. In a fifth vertical synchronizing signal, the target 2A receives the off signal and thus, in the N+4 field, only the reference target image 7 is displayed. By repeating this procedure, the image display is made on the video monitor 10 in accordance with each vertical synchronizing signal (each field) in order of "reference target image 7", "reference target image 7 +target image 1", "reference target image 7", "reference target image 7 +target image 2", "reference target image 7", "reference target image 7 +target image 3", . . . .

As mentioned above, time ranging from the generation of the vertical synchronizing signal appearing in each field to the generation of the video signal corresponding to the reference target image 7 and time to the generation of the video signals corresponding to the targets images 1, 2, 3, . . . appearing every second field are counted. Consequently, the relative coordinates of the targets images 1, 2, 3, . . . are calculated from the Y coordinate and the X coordinate of the reference target image 7 by the external devices.

Figure 8:
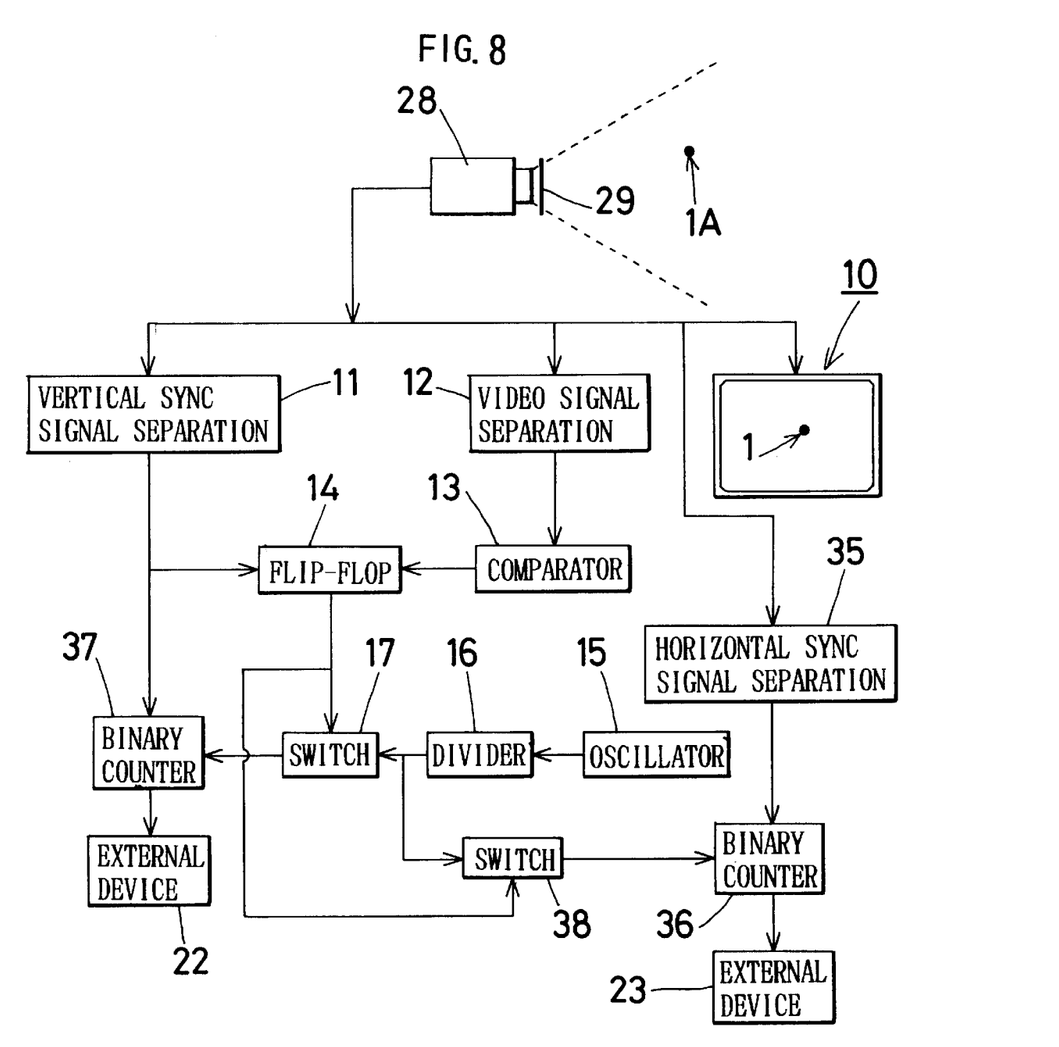
FIG. 8 is a circuit block diagram of an apparatus for calculating the coordinates of a target image to carry out the method of calculating the coordinates of a target image in a further aspect, applied to the present invention.

FIG. 8 shows an example of a circuit configuration of an apparatus for calculating the coordinates of a target image to carry out the method of calculating the coordinates of a target image in a further aspect, applied to the present invention. The apparatus for calculating the coordinates of a target image in this embodiment, as in the circuit configuration shown in FIG. 1, includes the video monitor 10, the vertical synchronizing signal separation circuit 11, the video signal separation circuit 12, the voltage comparator 13, the flip-flop circuit 14, the frequency divider 16, the oscillator 15, the switch circuit 17, and the external devices 22 and 23. For the binary counter, unlike that shown in FIG. 1, an 8-bit binary counter 37 is provided. In addition to these, the apparatus has a horizontal synchronizing signal separation circuit 35 for fetching a horizontal synchronizing signal from the NTSC composite signal of the video camera 28, an 8-bit binary counter 36, and a switch circuit 38.

The Y coordinate of the target image 1 of the target 1A displayed on the video monitor 10 is determined in such a way that time between the generation of the vertical synchronizing signal and that of the video signal is counted and the above calculation process for performing the calculation in accordance with this count time is used as it is. The X coordinate is calculated as follows: The horizontal synchronizing signal fetched from the output composite signal of the video camera 28 through the horizontal synchronizing signal separation circuit 35 resets the binary counter 36, which counts up a clock delivered from the switch circuit 38 conducting in a state where the flip-flop circuit 14 is reset. On the other hand, the video signal output from the voltage comparator 13 brings the flip-flop circuit 14 to a reset state, so that the switch circuit 38 is broken and the count of the binary counter 36 is completed. The X coordinate is calculated in accordance with this count time (time ranging from the generation of the horizontal synchronizing signal fetched from the composite signal immediately before the video signal is produced to the generation of the video signal, that is, time ranging from the start of the scan of one scanning line to the generation of the video signal).

Figure 9:
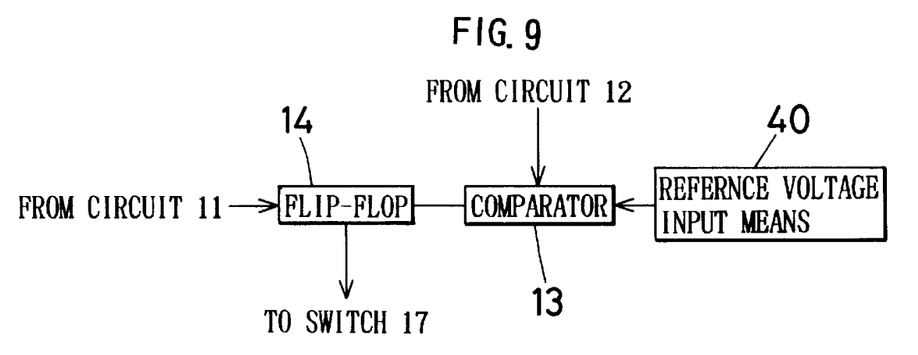
FIG. 9 is a view showing essential parts of a modified example of the circuit configuration of an apparatus for calculating the coordinates of a target image to carry out a method of calculating the coordinates of a target image applied to the present invention.

FIG. 9 shows an example of a circuit configuration of an apparatus for calculating the coordinates of a target image to carry out the method of calculating the coordinates of a target image in a still further aspect, applied to the present invention. In the apparatus for calculating the coordinates of a target image of this embodiment, an analog reference voltage input means 40 for setting the threshold of the video signal is added to the voltage comparator 13 of each of the above embodiments. The analog reference voltage input means 40 enables the reference voltage of the comparator 13 to be adjusted to the voltage sensitivity of the video signal coinciding with the luminance of the target 1A.

Figure 10:
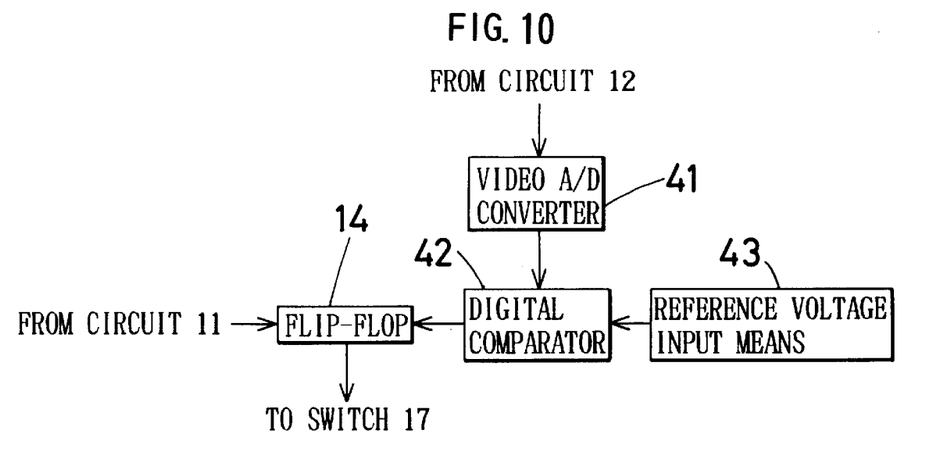
FIG. 10 is a view showing essential parts of another modified example of the circuit configuration of an apparatus for calculating the coordinates of a target image to carry out a method of calculating the coordinates of a target image applied to the present invention.

FIG. 10 shows a modified example of the circuit configuration in FIG. 9. In this embodiment, a digital comparator 42 is employed as a voltage comparator, and an analog-to-digital converter 41 for converting an analog video signal which is its input signal into a digital signal is interposed between the video signal separation circuit 12 and the digital comparator 42. A reference voltage input means 43 for setting the threshold is a digital input means. Therefore, for example, digital data output from another computer can be directly input.

In each of the above embodiments, the composite signal for carrying out the method of calculating the coordinates of a target image is derived from the output signal of the video camera. However, the derivation of the composite signal is not limited to this technique and the method of the present invention can be practiced even when a composite signal output from another video device is used.

According to the method of calculating the coordinates of a target image applied to the present invention, as mentioned above, the coordinates of the target image where it is displayed on the monitor can be calculated very rapidly. Moreover, even when the refresh rate of the image field is very high, the calculation of the coordinates can be performed without any delay with respect to the refresh rate. In this way, the present invention is very effective for applications to a high-speed tracking system for objects of high-speed motion requiring a very quick position analysis, an operation device for a TV game, and a data analysis of a device for recognizing a speaker, such as a person talking with hands, necessary for positioning on the monitor.

What is claimed is:

1. A method of calculating coordinates of a target image, comprising the steps of:

measuring time between generation of a vertical synchronizing signal fetched from a composite signal for displaying said target image on a video monitor and a singular change of a video signal fetched therefrom, and calculating a Y coordinate of said target image displayed on said video monitor from said time measured and calculating an X coordinate from measuring a time between generation of a horizontal synchronizing signal produced immediately before said video signal and said singular change.

2. The method according to claim 1, wherein said video signal bringing about said singular change is a maximum or minimum voltage signal selected from near video signals to the voltage signal.

3. The method according to claim 1, wherein said video signal bringing about said singular change is given from a voltage of a video signal compared with a threshold.

4. The method according to claim 1, wherein said target image is an image of a light-emitter photographed by a video camera.

5. An apparatus for calculating coordinates of a target image, comprising:

means for generating a composite signal to display a target image on a video monitor;

means for measuring time between generation of a vertical synchronizing signal fetched from said composite signal and a singular change of a video signal therefrom, and means for calculating coordinates of said target image displayed on said video monitor comprising means for calculating a Y coordinate from said time measured and means for calculating an X coordinate from measuring time between generation of a horizontal synchronizing signal produced immediately before said video signal and said singular change.

6. The apparatus according to claim 5, wherein said video signal bringing about said singular change is given by a comparator for selecting a maximum or minimum voltage from near video signals to the voltage signal.

7. The apparatus according to claim 6, wherein said comparator is means for comparing a voltage of each video signal compared with a threshold.

8. The apparatus according to claim 5, wherein said means for generating said composite signal is a video camera.

9. The method according to claim 4, wherein said light-emitter is an infrared-emitting element.

10. The apparatus according to claim 8, wherein said video camera includes an infrared-transparent filter.

* * * * *